(12) United States Patent
Hammer et al.

(10) Patent No.: US 11,428,358 B2
(45) Date of Patent: Aug. 30, 2022

(54) FLUID INTERACTION DEVICE, FLUID INTERACTION ARRANGEMENT AND METHOD FOR PRODUCING SAME

(71) Applicant: Cooper-Standard Automotive (Deutschland) GmbH, Schelklingen (DE)

(72) Inventors: Ole Hammer, Schelklingen (DE); Brian Cardwell, Schelklingen (DE); Steve Frederiksen, Schelklingen (DE); Kenneth Gocha, Schelklingen (DE); Arthur Janik, Schelklingen (DE)

(73) Assignee: COOPER-STANDARD AUTOMOTIVE (DEUTSCHLAND) GMBH, Schelklingen (DE)

(*) Notice: Subject to any disclaimer, the term of this patent is extended or adjusted under 35 U.S.C. 154(b) by 653 days.

(21) Appl. No.: 15/982,381

(22) Filed: May 17, 2018

(65) Prior Publication Data
US 2018/0335172 A1 Nov. 22, 2018

(30) Foreign Application Priority Data
May 17, 2017 (EP) .................... 17171546

(51) Int. Cl.
| F16L 37/14 | (2006.01) |
| F16L 47/02 | (2006.01) |
| F16K 37/00 | (2006.01) |
| F16L 37/084 | (2006.01) |
| F16L 41/00 | (2006.01) |
| G01D 11/30 | (2006.01) |
| F16L 47/32 | (2006.01) |
| G01L 19/00 | (2006.01) |

(52) U.S. Cl.
CPC .......... *F16L 37/144* (2013.01); *F16K 37/005* (2013.01); *F16L 37/0841* (2013.01); *F16L 41/008* (2013.01); *F16L 47/02* (2013.01); *G01D 11/30* (2013.01); *F16L 47/32* (2013.01); *G01L 19/0038* (2013.01)

(58) Field of Classification Search
CPC ..... F16L 37/144; F16L 37/0841; F16L 47/02; F16L 55/04; F16L 55/041; F16K 37/005
USPC ............................................ 285/41, 93, 319
See application file for complete search history.

(56) References Cited

U.S. PATENT DOCUMENTS

| 6,832,785 B1* | 12/2004 | Zitkovic, Jr. ........... F16L 47/02 |
| 2005/0127664 A1 | 6/2005 | Arth et al. |
| 2005/0127668 A1 | 6/2005 | Mobley et al. |
| 2007/0212912 A1 | 9/2007 | Osborne et al. |
| 2008/0296888 A1* | 12/2008 | Blivet ..................... F16L 47/02 |

(Continued)

FOREIGN PATENT DOCUMENTS

| EP | 2505900 A1 | 10/2012 |
| WO | 2007/106749 A2 | 9/2007 |

*Primary Examiner* — Zachary T Dragicevich
(74) *Attorney, Agent, or Firm* — Reising Ethington, P.C.

(57) ABSTRACT

A fluid interaction device for establishing an interaction with a fluid, particularly a brake fluid or a fuel fluid. A housing member accommodates a fluid interaction portion. The fluid interaction portion is adapted to interact with a fluid within the housing member. The housing member further comprises a connection portion which can be connected to a fluid supply element. The connection portion is formed as a weldable, tubular end portion so that the housing member can be connected to a joining portion of the fluid supply element by means of a welded joint.

21 Claims, 6 Drawing Sheets

(56) References Cited

U.S. PATENT DOCUMENTS

| | | | |
|---|---|---|---|
| 2010/0045028 A1* | 2/2010 | Blivet | F16L 47/02 |
| 2010/0126303 A1 | 5/2010 | Mai et al. | |
| 2010/0176589 A1* | 7/2010 | Bauer | F16L 37/144 |
| 2011/0148096 A1 | 6/2011 | Engle et al. | |
| 2013/0147184 A1 | 6/2013 | Lutzke et al. | |
| 2014/0202201 A1* | 7/2014 | Czyz | F16L 55/04 |
| 2014/0319820 A1* | 10/2014 | Takimoto | F16L 37/144 |
| 2018/0022592 A1* | 1/2018 | Deans | F16K 37/005 |
| 2018/0306363 A1* | 10/2018 | Oberdorfer | F16L 37/144 |

\* cited by examiner

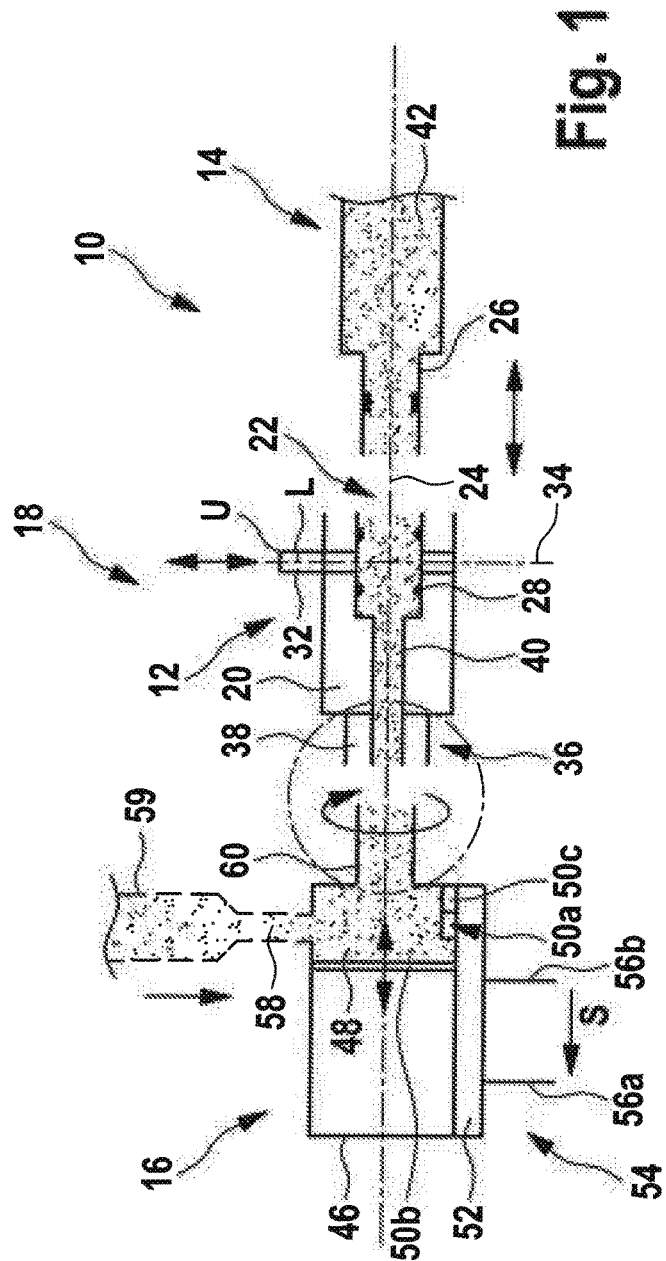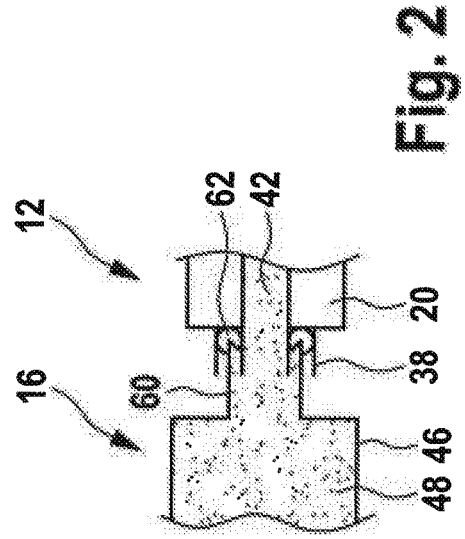

FLUID INTERACTION DEVICE, FLUID INTERACTION ARRANGEMENT AND METHOD FOR PRODUCING SAME

CROSS-REFERENCE TO RELATED APPLICATIONS

This application claims the priority of European patent application EP 17 171 546.9, filed May 17, 2017, the entire content of this earlier application being incorporated herein by reference.

BACKGROUND

The present invention relates to a fluid interaction device for establishing an interaction with a fluid, particularly a brake fluid or a fuel fluid, having a housing member which accommodates a fluid interaction portion, the fluid interaction portion being adapted to interact with a fluid within the housing member, wherein the housing member further comprises a connection portion which can be connected to a fluid supply element.

Further, the present invention relates to a fluid interaction arrangement comprising a quick connection device and a fluid interaction device.

Finally, the present invention relates to a method for producing such fluid interaction arrangement.

Vehicles include various fluid systems, including brake fluid systems and fuel fluid systems. The fluid systems typically include rigid pipes, flexible hoses, connectors, gates, switches, etc., for guiding fluid from a fluid source to a fluid consumer or to transfer energy in the form of pressure. In brake fluid systems and fuel fluid systems, the lines (hoses, pipes, etc.) are typically realized with several layers, so as to address the needs of such systems in the environment of vehicles. For example, it is necessary to address corrosion issues, as the environment of vehicles is harsh. Further, in brake fluid lines, the brake fluid can have a considerable pressure, so that elasticity and compressibility of those lines need to be addressed. Further, the connections between line elements are, in many cases, realized by means of non-severable or non-separable joints. In order to facilitate maintenance and exchange of line elements, some of the connections are realized by so-called quick connectors. Quick connectors can be used to connect two line elements or more than two line elements. A quick connector typically has at least one fluid line reception portion into which a line end portion of a fluid line can be inserted. Further, a quick connector, in many cases, includes a mechanical mechanism, e.g. a slider, that is movable with respect to the fluid line reception portion between an unlocking position and a locking position, in order to mechanically unlock or lock the line end portion of the fluid line with respect to the fluid line reception portion. In the locking position, the fluid line is connected to and sealed against the quick connector, such that the interior of the fluid line is connected to a conduit portion of the quick connector.

In many cases, it is necessary to provide in such fluid systems an interaction with the fluid, for example for sensing conditions or properties of the fluid, for dampening vibrations within the fluid, produced for example by means of intermittently operating fluid pumps, etc.

In the field of such fluid systems, a fluid sensor assembly is known, wherein a quick connector body has a first port adapted to connect a fluid line and an internal passage connecting the first port to a second port. Further, the quick connector includes a sensor interface portion attached to the body. A fluid sensor is adapted to interface with the sensor interface portion, the fluid sensor including a sensing element in communication with the internal passage via the second port. An attaching portion affixes the fluid sensor to the sensor interface portion, to form a single, integrated part. The attaching portion is an attaching ring or an adhesive, wherein the attaching ring needs to be bent in order to attach the sensor portion to the quick connector body.

SUMMARY

Against the above background, it is an object of the disclosure to provide an improved fluid interaction device, an improved fluid interaction arrangement as well as an improved method for producing a fluid interaction arrangement.

The above object is achieved by a fluid interaction device for establishing an interaction with a fluid, particularly a brake fluid or a fuel fluid, having a housing member which accommodates a fluid interaction portion, the fluid interaction portion being adapted to interact with a fluid within the housing member, wherein the housing member further comprises a connection portion which can be connected to a fluid supply element, and wherein the connection portion is formed as a weldable, tubular end portion so that the housing member can be connected to a joining portion of the fluid supply element by means of a welded joint.

Further, the above object is achieved by a fluid interaction arrangement, comprising a quick connection device and a fluid interaction device according to the disclosure.

Finally, the above object is achieved by a method for producing a fluid interaction arrangement according to the disclosure, comprising the steps of providing a quick connection device which has a joining portion adapted for welding; providing a fluid interaction device which has a weldable, tubular end portion; welding the tubular end portion to the joining portion along a joining axis.

The fluid interaction arrangement according to the disclosure is preferably a combination of a standard quick connection device which includes a standard fluid line reception portion as a first port and a tube reception portion with an annular groove as a second port, in combination with a fluid interaction device, which includes a housing member and a connection portion that is formed so as to allow establishing a welded joint between the connection portion and the tube reception portion. The tube reception portion of the quick connection device, which forms a fluid supply element within the frame, is a standard port to which, typically, tubes for guiding fluid are welded, preferably friction welded. The welded joint, however, can also be formed by a laser welded joint and/or by an infrared welded joint and/or by an ultrasonic welded joint. In case of a friction welded joint, the preferred embodiment is a spin welded joint.

The fluid interaction portion can be adapted to provide a passive interaction with the fluid in the housing member, or an active interaction. The interaction can be a one-way interaction, wherein the fluid acts on the fluid interaction portion, or vice versa. As an alternative, the interaction can be bi-directional.

The material of the connection portion is preferably a thermoplastic material, particularly a thermoplastic weldable material, for example PA12 (nylon 12).

In the fluid interaction arrangement, an annular groove of the quick connection device may be also formed by a thermoplastic material. The thermoplastic material defining the annular groove of the fluid supply element or of the quick connection device (quick connector) can be the same material as the material of the tubular end portion, or can be a material different from the material of the tubular end portion.

The welded joint is preferably a thermoplastic welded joint.

Preferably, the heat for producing a friction welded joint can be produced by a lateral relative movement between the quick connection device and the fluid interaction device, or by a relative circular movement. In case that the welded joint is produced by ultrasonic welding, a relative movement between the quick connection device and the fluid interaction device can be an axial relative movement.

The fluid interaction device can have one dead-end cavity into which fluid from the fluid supply element is introduced and via which the fluid interaction can take place. Therefore, the fluid interaction can take place with fluid that is introduced via the connection portion and leaves the fluid interaction device via the same connection portion. Such cavity is preferably in communication with fluid through one or more passages. As an alternative, the fluid interaction device can have a conduit so that fluid can flow from the connection portion to another port of the fluid interaction device. In this case, the fluid interaction can take place with fluid that flows from the connection portion to another port of the fluid interaction device, or vice versa.

The object is achieved in full.

In a preferred embodiment of the fluid interaction device, the tubular end portion is rotationally symmetric along a joining axis, wherein the joining portion is an annular groove, and wherein the welded joint is a friction welded joint, preferably a spin welded joint.

In this embodiment, the friction welded joint is produced by a relative rotation between the fluid interaction device and the fluid supply element, which relative rotation is concentric to the joining axis.

In the method according to the disclosure, it is preferred, if the joining portion is an annular groove, wherein the welding step includes establishing a relative rotation between the quick connection device and the fluid interaction device so that friction heat is generated therebetween and at least one of material defining the annular groove and material of the tubular end portion is melted; and stopping the relative rotation so that the material can cool down and solidifies, in order to create a friction welded joint between the quick connection device and the fluid interaction device.

In another preferred embodiment, the tubular end portion has an outer diameter and an axial length, wherein the ratio of the outer diameter to the axial length is in a range from 0.5 to 3.0, particularly in a range from 0.7 to 1.5, preferably in a range from 0.8 to 1.4 or from 0.9 to 1.3.

The above ratio allows to establish an axially short friction welded joint.

According to another preferred embodiment, the tubular end portion has an inner diameter and a wall thickness, wherein a ratio of the inner diameter to the wall thickness is in a range from 4.0 to 16.0, particularly in a range from 6.0 to 12.0, preferably in a range from 7.0 to 10.0.

This ratio of inner diameter to wall thickness allows to establish a solid friction welded joint.

In another preferred embodiment, the housing member defines a housing member fluid conduit connecting the tubular end portion to a port of the housing member, so as to allow fluid being guided from the tubular end portion to the port, or vice versa.

In this embodiment, the fluid interaction portion is associated to the housing member fluid conduit, so that an interaction with fluid can take place, which is guided between the tubular end portion and the port.

The port can be any type of port to which a fluid line can be connected.

Further, it is preferred if the tubular end portion defines a reception cavity for receiving a ring portion of the fluid supply element.

This embodiment facilitates centering of the tubular end portion and the annular groove during the friction welding step.

In addition, the rigidity of the joint between the fluid interaction device and the quick connection device can be enhanced. Optionally, another friction welded joint may be produced between the reception cavity and the ring portion.

Here, it is preferred if the reception cavity is connected with the fluid interaction portion.

To this purpose, the reception cavity can be connected via a channel to the fluid interaction portion, or in any other suitable manner.

Further, it is preferred if the fluid interaction portion includes a sensor arrangement, particularly a pressure sensor and/or a temperature sensor. In case of a pressure sensor, the fluid interaction device can have a dead-end cavity. In case of a temperature sensor, it is preferred if the fluid interaction can take place with fluid that flows from the connection portion to another part, or vice versa.

The sensor arrangement is preferably adapted to sense a state variable of the fluid and is preferably a passive sensor arrangement.

In another preferred embodiment, the fluid interaction portion includes a damper arrangement.

The damper arrangement is useful for damping vibrations in the fluid, caused for example by an intermittently operating pump. The damper arrangement can be membrane-based or can be formed by an elastic damper body disposed in a damper chamber of the housing member. The damper arrangement may also comprise an air damper. The damper arrangement is preferably a passive portion.

In another embodiment, the fluid interaction portion includes an active fluid influencing arrangement, in particular a fluid cooler and/or a fluid heater.

Here, the fluid interaction portion may act on the fluid, by heating the fluid, by cooling the fluid or by influencing the fluid in any other manner.

In the fluid interaction arrangement according to the disclosure, it is preferred if the quick connection device includes (i) a fluid line reception portion into which a line end portion of a fluid line can be inserted along a fluid line axis, (ii) a mechanical mechanism that is movable with respect to the fluid line reception portion between an unlocking position and a locking position parallel to a mechanical mechanism axis that is oriented transverse to the fluid line axis, in order to mechanically unlock or lock the line end portion of the fluid line with respect to the fluid line reception portion, and (iii) a tube reception portion, the tube reception portion having the annular groove into which the tubular end portion of the fluid interaction device has been inserted along a tube axis, and wherein a friction welded joint is established between the tube reception portion and the tubular end portion.

Here, the quick connection device may be a quick connector that includes an interface in the form of a tube reception portion for spin or friction welding a tube to the quick connector. This interface is, in the present case, used for connecting the fluid interaction device to the quick connector.

Preferably, the tubular end portion has an inner diameter which is smaller than an outer diameter of an inner ring portion of the quick connection device, the inner ring portion defining an inner diameter of the annular groove.

Preferably, a difference between the inner diameter of the tubular end portion and an outer diameter of an inner ring portion of the quick connection device is in a range between 0.2 mm to 1.0 mm, preferably in a range of 0.4 mm to 0.8 mm, preferably in a range from 0.5 mm to 0.7 mm.

In another preferred embodiment, the tubular end portion has a wall thickness which is larger than a radial groove thickness of the annular groove.

The dimensional difference between the wall thickness of the tubular end portion and the radial groove thickness of the annular groove is preferably in a range of 0.05 mm to 0.25 mm, preferably in a range from 0.1 to 0.2 mm, particularly preferred in a range from 0.12 mm to 0.16 mm, which range(s) are preferred in order to be able to produce a robust welded joint. In general, it is preferred if both the inner diameter and the outer diameter of the tubular end portion weld to mating areas on the annular groove. However, acceptable welded joints can be produced even in those cases, where only the inner diameter or the outer diameter produces the weld.

It will be understood that the features of the disclosure mentioned above and those yet to be explained below can be used not only in the respective combination indicated, but also in other combinations or in isolation, without leaving the scope of the present invention.

BRIEF DESCRIPTION OF THE SEVERAL VIEWS OF THE DRAWING

Exemplary embodiments of the disclosure are explained in more detail in the following description and are represented in the drawings, in which:

FIG. 1 shows a schematic view of a fluid pipeline arrangement including a fluid interaction arrangement according to a first embodiment, before establishing the friction welded joint therebetween;

FIG. 2 shows a detailed view of a friction welded joint of the fluid interaction arrangement of FIG. 1;

EMBODIMENTS

Figure 3:
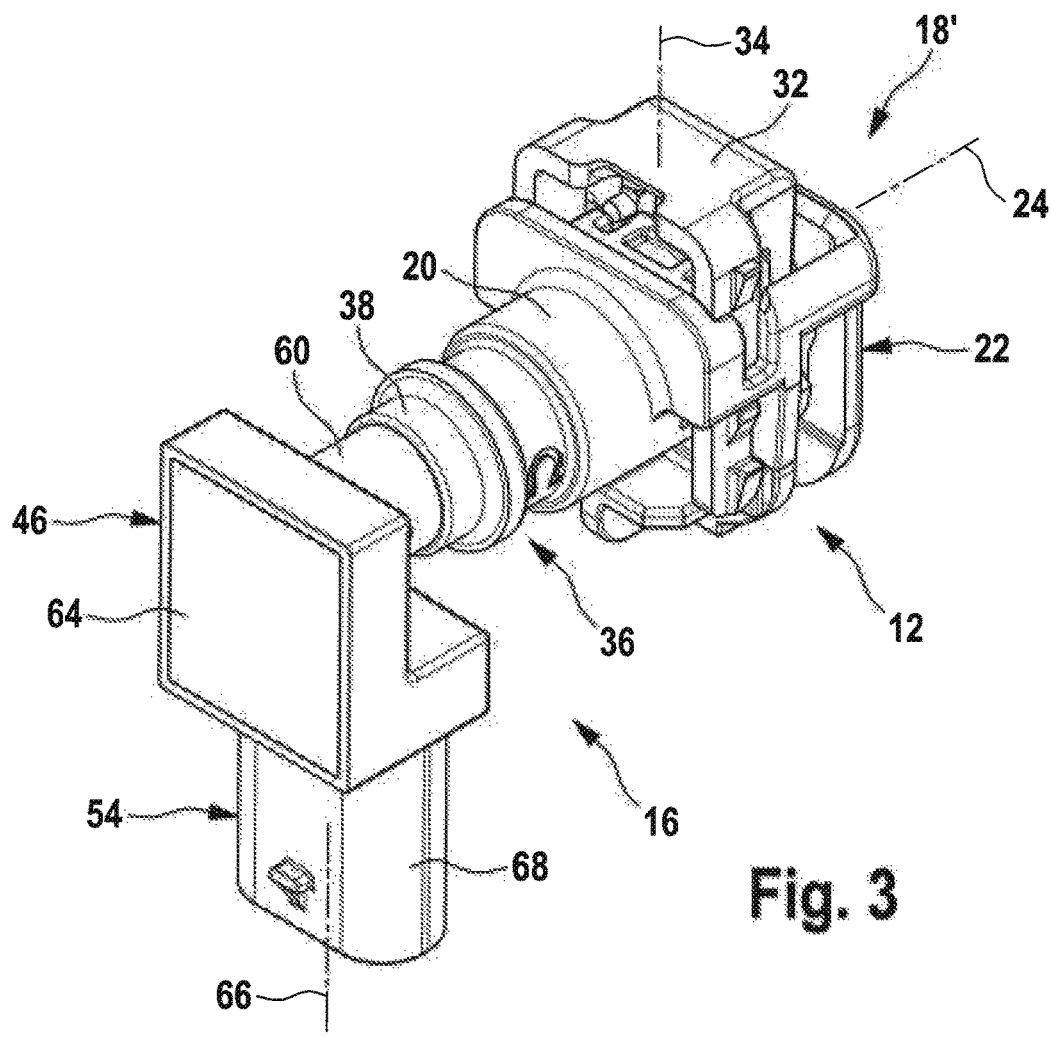
FIG. 3 shows a perspective view of another embodiment of a fluid interaction arrangement.
Figure 4:
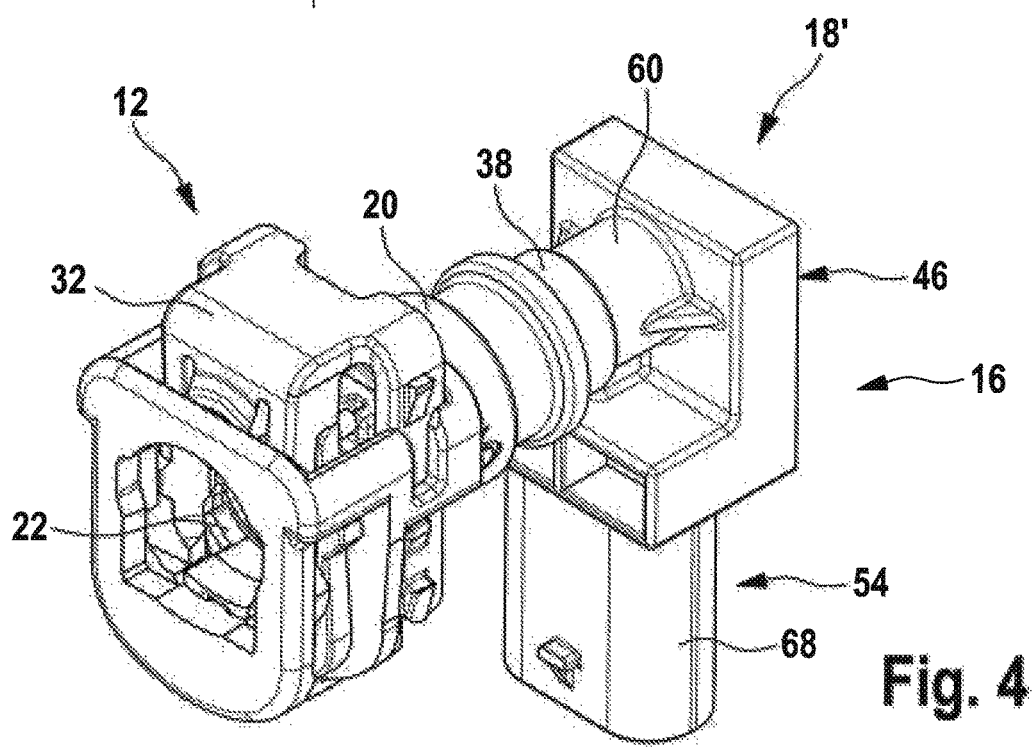
FIG. 4 shows another perspective view of the fluid interaction arrangement of FIG. 3.

In FIG. 1, a fluid pipeline arrangement is schematically shown and generally assigned the reference numeral 10. The fluid pipeline arrangement is particularly a brake fluid pipeline arrangement or a fuel fluid pipeline arrangement for vehicular applications. The fluid pipeline arrangement 10 includes a quick connector 12, which may be formed by a standard quick connector element. Further, the fluid pipeline arrangement 10 includes a fluid line 14 via which fluid can be supplied. The fluid pipeline arrangement 10, further, includes a fluid interaction device 16.

The fluid interaction device 16 and the quick connector 12 together form a fluid interaction arrangement 18.

The quick connector 12 includes a quick connector body 20. A fluid line reception portion 22 is formed on the quick connector body 20. The fluid line reception portion 22 is aligned along a fluid line axis 24. A line end portion 26 of the fluid line 14 can be introduced along the fluid line axis 24 into the fluid line reception portion 22. Sealing elements 28 are provided in order to establish a sealed connection between the fluid line 14 and the quick connector 12.

The quick connector 12, further, includes a mechanical mechanism 32 that can be moved along a mechanical mechanism axis 34 between an unlocking position U and a locking position L. The mechanical mechanism axis 34 is oriented transverse to the fluid line axis 24.

The line end portion 26 of the fluid line 14 can be introduced into the fluid line reception portion 22 if the mechanical mechanism 32 is in the unlocking position U. The unlocking position U may be realized as a release position which allows to release a line end portion 26 from the quick connector 12. As soon as the line end portion 26 has been introduced into the fluid line reception portion 22, the mechanical mechanism 32 can be moved into the locking position. In the locking position, the fluid line 14 and the quick connector 12 are mechanically locked to each other. Further, the mechanical mechanism 32 may be used to establish or enhance a sealing arrangement between the fluid line 14 and the quick connector 12. The line end portion 26 can only be released from the fluid line reception portion 22, if the mechanical mechanism 32 is returned into the unlocking position U.

The quick connector body 20 further includes a tube reception portion 36. The tube reception portion 36 forms a second port of the quick connector body 20 and includes an annular groove 38, into which a tube end portion of a tube can be inserted, in order to connect a tube to the tube reception portion 36. The tube reception portion 36 and the fluid line reception portion 22 are connected to each other within the quick connector body 20 by means of a central conduit 40.

FIG. 1 shows that fluid 42 present in the fluid line 14 can flow through the central conduit 40 to the tube reception portion 36.

The fluid interaction device 16 includes a housing member 46. Within the housing member 46, a fluid cavity 48 is provided, into which fluid can be introduced. The fluid interaction device 16 includes at least one fluid interaction portion that can interact with fluid present in the fluid cavity 48.

In FIG. 1, there are shown a first fluid interaction portion 50a, a second fluid interaction portion 50b, and a third fluid interaction portion 50c.

The first fluid interaction portion 50a may include a sensor for sensing a state variable of fluid within the fluid cavity 48. The fluid interaction portion 50a may be connected to a sensor body 52, wherein an electrical contact portion 54 extends from the sensor body 52. The electrical contact portion 54 includes at least two contact pins 56a, 56b. An electrical signal, represented by an electrical voltage S in FIG. 1, can be derived from the sensor of the fluid interaction portion 50a, for example a signal reflecting the temperature and/or the pressure of the fluid within the fluid cavity 48.

The second fluid interaction portion 50b is formed as a damper arrangement which may include an air damper or a membrane, as is shown schematically in FIG. 1, which membrane is elastically movable, so as to dampen vibrations within the fluid present in the fluid cavity 48.

The third fluid interaction portion 50c can be an active interaction portion, for example a fluid cooler and/or a fluid heater. Although not shown in FIG. 1, it is to be noted that an energy supply needs to be connected to the third fluid interaction portion 50c, in order to actively influence the fluid within the fluid cavity 48.

The fluid cavity 48 is connected to a tubular end portion 60 of the housing member 46. The tubular end portion 60 is formed like an end portion of a tube that can be connected to the tube reception portion 36 of the quick connector 12. Therefore, the tubular end portion 60 of the housing member 46 can be inserted along a joining axis into the annular groove 38 of the quick connector 12. Further, as shown in FIG. 2, a friction welded joint 62 can be produced between the tube reception portion 36 and the tubular end portion 60 of the housing member 46, wherein the friction welded joint is preferably a spin welded joint produced by a relative rotation between the housing member 46 and the quick connector 12. The relative rotational movement is preferably concentric to a joining axis along which the tubular end portion 60 is introduced into the annular groove 38, which, in the present case, but not necessarily, is identical to the fluid line axis 24.

The fluid cavity 48 can be a closed cavity, which has only one opening which opens to the tubular end portion 60, so that fluid from the conduit 40 of the quick connector 12 can be introduced into the fluid cavity 48.

In another embodiment, shown in dashed lines in FIG. 1, the housing member 46 includes an additional port 58, to which another line element can be connected so that fluid can be exchanged between the tubular end portion 60 and the second port 58. The second port 58 can be of any port type, for example formed as a second tubular end portion on the housing member 46. Further, the port 58 can be connected to any other fluid guiding element, for example to a second tube 59, as shown in FIG. 1. In this embodiment, fluid 42 can flow through the tubular end portion 60 to the additional port 58, or vice versa. The fluid interaction portion(s) 50 is/are arranged in flowing direction between the tubular end portion 60 and the second port 58, so that flowing fluid can interact with the fluid interaction portion, particularly a sensor of the fluid interaction portion.

The connection between the fluid line 14 and the quick connector 12 is a releasable connection. On the other hand, the connection between the quick connector 12 and the fluid interaction device 16 is a weld connection which is non-releasable.

In FIGS. 3 to 10, another embodiment of a fluid interaction arrangement 18' is shown, the function and general layout of which corresponding to the fluid interaction arrangement 18 of FIGS. 1 and 2. Identical elements are designated by identical reference numerals. In the following, mainly the differences between the embodiments will be explained.

As shown in FIG. 3, the housing member 46 may be formed of a basic housing which is produced by injection-molding, wherein the basic housing defines a cavity which is closed by a lid 64 which is thermoplastically welded to the basic housing of the housing member 46.

In addition, the electrical contact portion 54 is formed by a socket 68 which is arranged along a contact axis 66 which is transverse to the fluid line axis 24. The fluid line axis 24 is, as in the embodiment of FIGS. 1 and 2 coaxial with the joining axis between the tubular reception portion 36 and the tubular end portion 60. In other embodiments, the joining axis and the fluid line axis 24 can be arranged transverse to each other.

Figure 7:
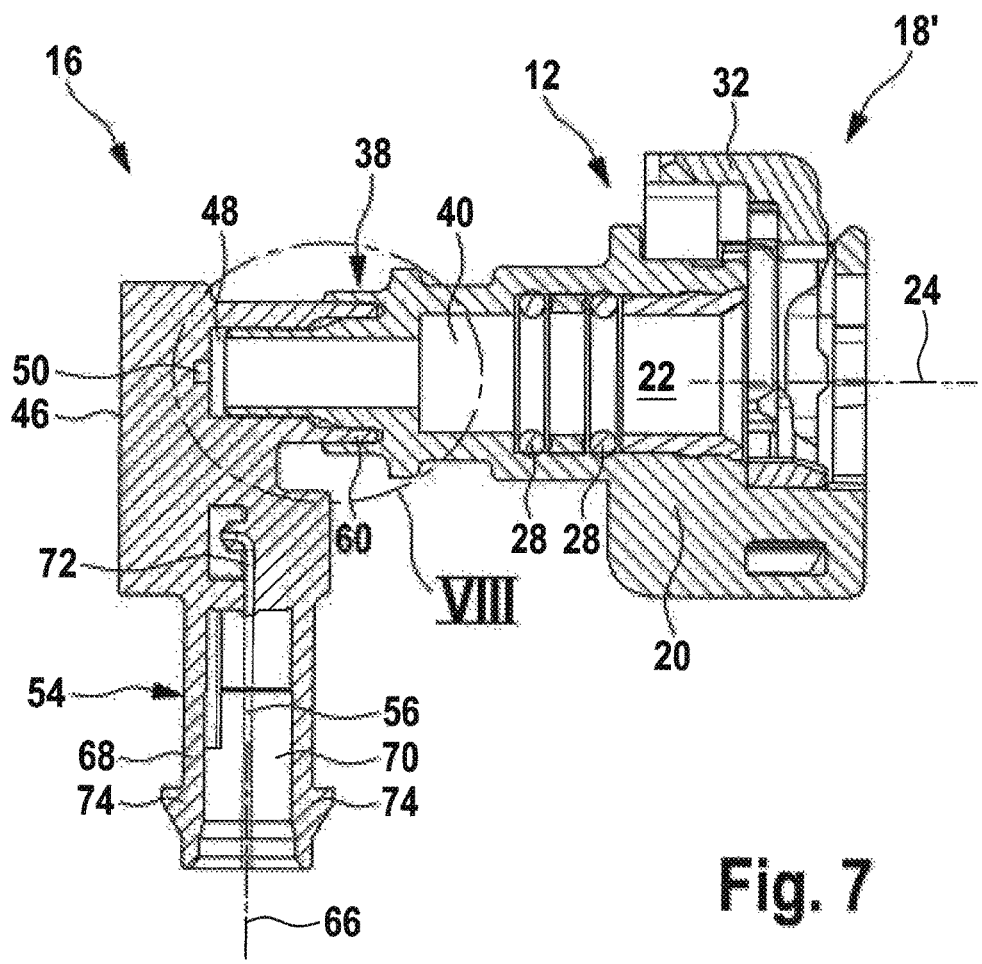
FIG. 7 shows a sectional view along a line VII-VII in FIG. 6.

As is shown particularly in FIG. 7, the socket 68 defines a socket cavity 70. The contact pins 56 of the electrical contact portion 54 are arranged within the socket cavity 70. An electrical plug can be connected to the socket, so as to electrically contact the contact pins 56. The contact pins 56 are connected via an electrical wiring 72 to a fluid interaction portion 50 which is schematically shown in FIG. 7 as being arranged adjacent to a fluid cavity 48 of the housing member 46.

The socket 68, further, includes two latching noses 74 at its outer circumference, which latching noses 74 allow to latchingly engage a plug housing.

Figure 5:
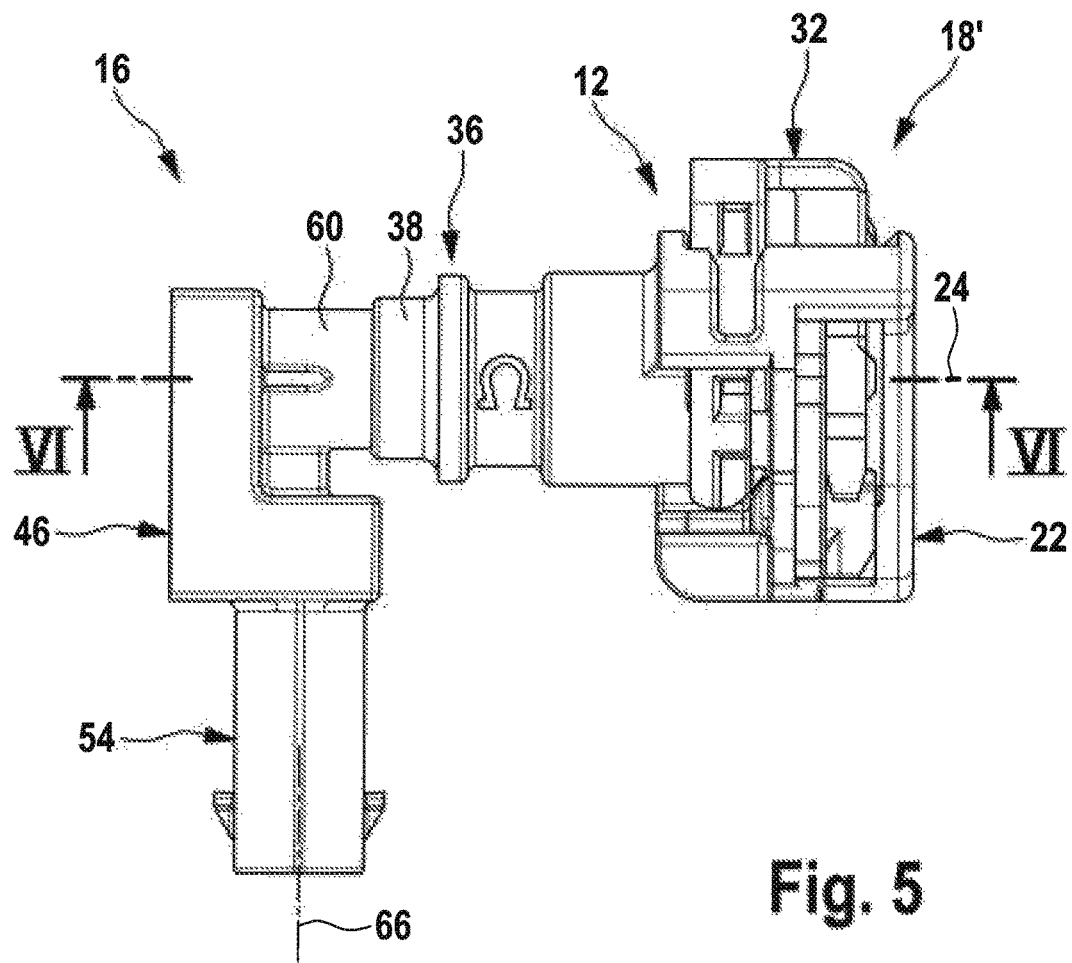
FIG. 5 shows a side view of the fluid interaction arrangement of FIGS. 3 and 4.
Figure 6:
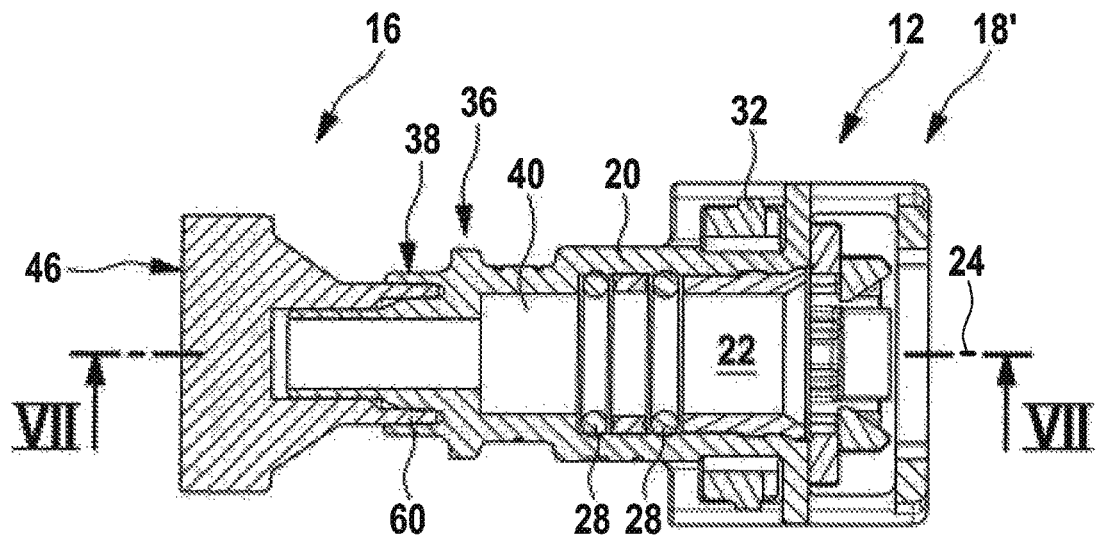
FIG. 6 shows a sectional view along a line VI-VI in FIG. 5.

In FIGS. 6 and 7 there is shown schematically the relation between the fluid cavity 48 and the fluid interaction portion 50. In many cases, the fluid cavity 48 can be larger than shown. In other cases, another cavity may be provided within the housing member 46 which is, for example, connected to the fluid cavity 48 by means of a channel. A sensor arrangement can be arranged at this additional cavity. Further, other fluid interaction portions, as schematically shown in FIG. 1, can be integrated into the housing member 46 of FIGS. 3 to 10.

Figure 8:
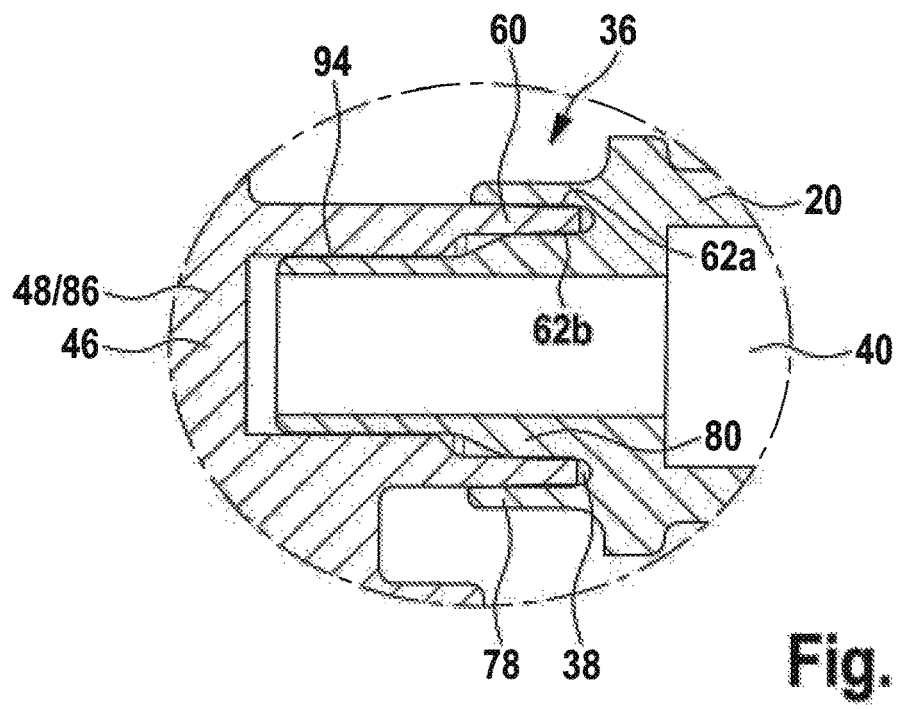
FIG. 8 shows a view of a detail VIII of FIG. 7.

FIG. 8 is a detailed view of the joining arrangement between the housing member 46 and the quick connector body 20. As can be identified in FIG. 8, the tubular end portion 60 has been inserted into the annular groove 38 of the tube reception portion 36 of the quick connector body 20. Further, FIG. 8 shows that the annular groove 38 is formed by an outer ring portion 78 and an inner ring portion 80. The friction welded joint is formed in this case by two friction welded joints 62a, 62b, the friction welded joint 62a being formed between the outer circumference of the tubular end portion 60 and the inner circumference of the outer ring portion 78, and the second friction welded joint 62b being formed between the inner circumference of the tubular end portion 60 and the outer circumference of the inner ring portion 80. The friction welded joint arrangement made by the two friction welded joints 62, 62b is fluid-tight and forms a non-releasable rigid connection between the quick connector body and the housing member 46.

Figure 9:
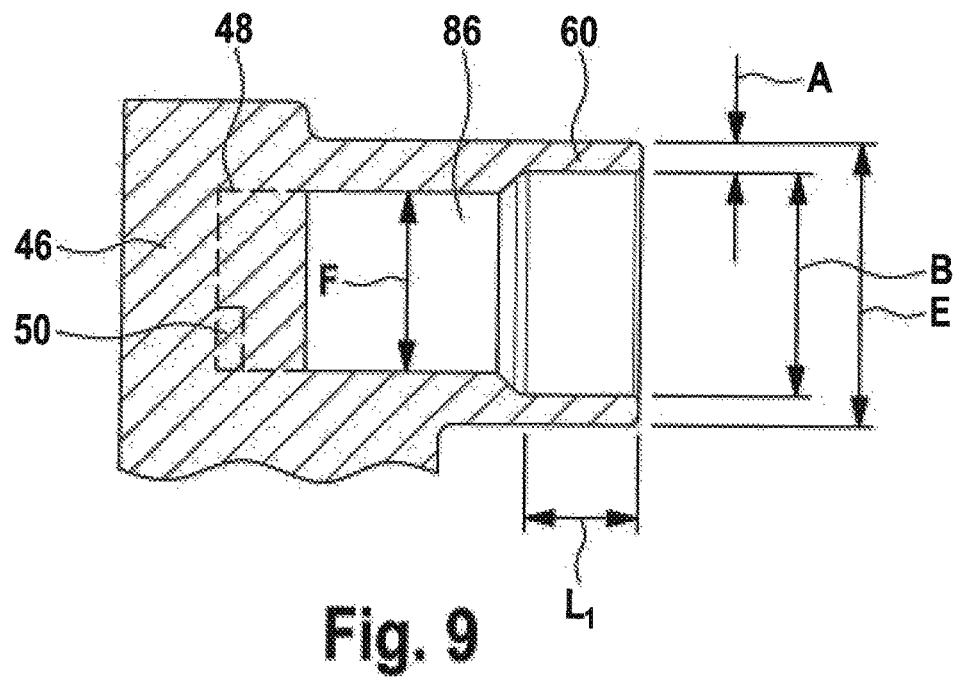
FIG. 9 shows a partial view of a housing member of the fluid interaction device of FIGS. 3 to 8.

FIG. 9 shows the housing member 46 in a cross-sectional view. The tubular end portion 60 has a radial wall thickness A and an inner diameter B. The axial length of the tubular end portion 60 is shown at $L_1$. The outer diameter of the tubular end portion 60 is shown at E.

The tubular end portion 60 transitions into an insertion cavity 86 of the housing member 46, which insertion cavity 86 may be formed contiguous with the fluid cavity 48, or may be formed separate therefrom, but connected via a channel or the like. In FIG. 9, the fluid cavity 48 is schematically shown as being adjacent to the insertion cavity 86. The insertion cavity 86 has an inner diameter F which is smaller than the inner diameter B of the tubular end portion 60, wherein the diameters E, F transition via a tapered portion which is not designated in detail in FIG. 9.

Figure 10:
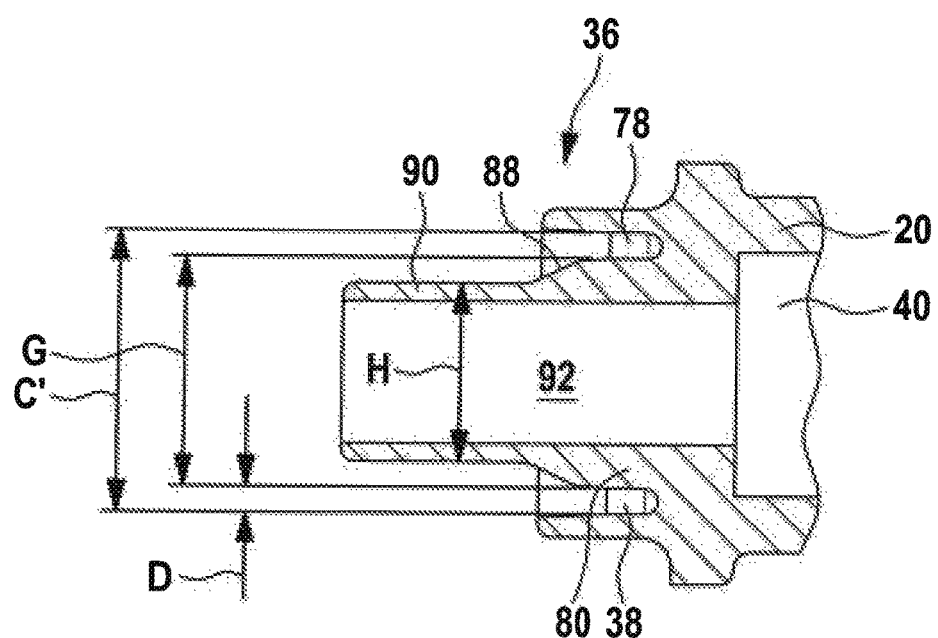
FIG. 10 shows a partial view of a body of a quick connection device of the fluid interaction arrangement of FIGS. 3 to 8.

FIG. 10 shows the tube reception portion 36 of the quick connector body 20. The annular groove 38 is formed by the outer ring portion 78 and the inner ring portion. The inner ring portion 80 transitions via a cone portion 88 into an annular protrusion 90. A conduit portion 92 is formed inside the annular protrusion 90, which conduit portion 92 is connected to the central conduit 40 of the quick connector body 20.

The inner ring portion 80 has an outer diameter C. The radial groove thickness of the annular groove 38 is shown at D. The inner diameter of the outer ring portion 78 is shown at G. The outer diameter of the annular protrusion 90 is shown at H.

For the above dimensions as shown in FIGS. 9 and 10, the following relations preferably apply:

$0.5 \leq E/L_1 \leq 3.0$ $4.0 \leq B/A \leq 16.0$ $H \leq F$ $0.2 \text{ mm} \leq (C-B) \leq 1.0 \text{ mm}$ $0.05 \text{ mm} \leq (A-D) \leq 0.25 \text{ mm}$ The material of at least one of the tubular end portion 60 and the material defining the annular groove 38 (inner and outer ring portions 78, 80), is a thermoplastic material, preferably PA 12 or a similar material.

The friction welded joint 62 (62a, 62b) is preferably produced by establishing a relative rotation between the housing member 46 and the quick connector 20, wherein the relative rotation is preferably a reciprocating rotational movement, i.e. a rotational vibration, which is concentric around the joining axis.

As is shown in FIG. 8, the annular protrusion 90 extends into the insertion cavity 86 and allows to stabilize the joint between the quick connector body 20 and the housing member 46. In some cases, the dimensions H and F may be selected such that another friction welded joint 94 is formed during the friction welding process between the outer circumference of the annular protrusion 90 and the inner circumference of the insertion cavity 86, as is schematically indicated at 94 in FIG. 8.

The housing member 46 may be formed by injection molding. Similarly, the quick connector body 20 may be formed by injection molding. The material can be a pure thermoplastic material, or can be a fiber reinforced thermoplastic material.

Figure 11:
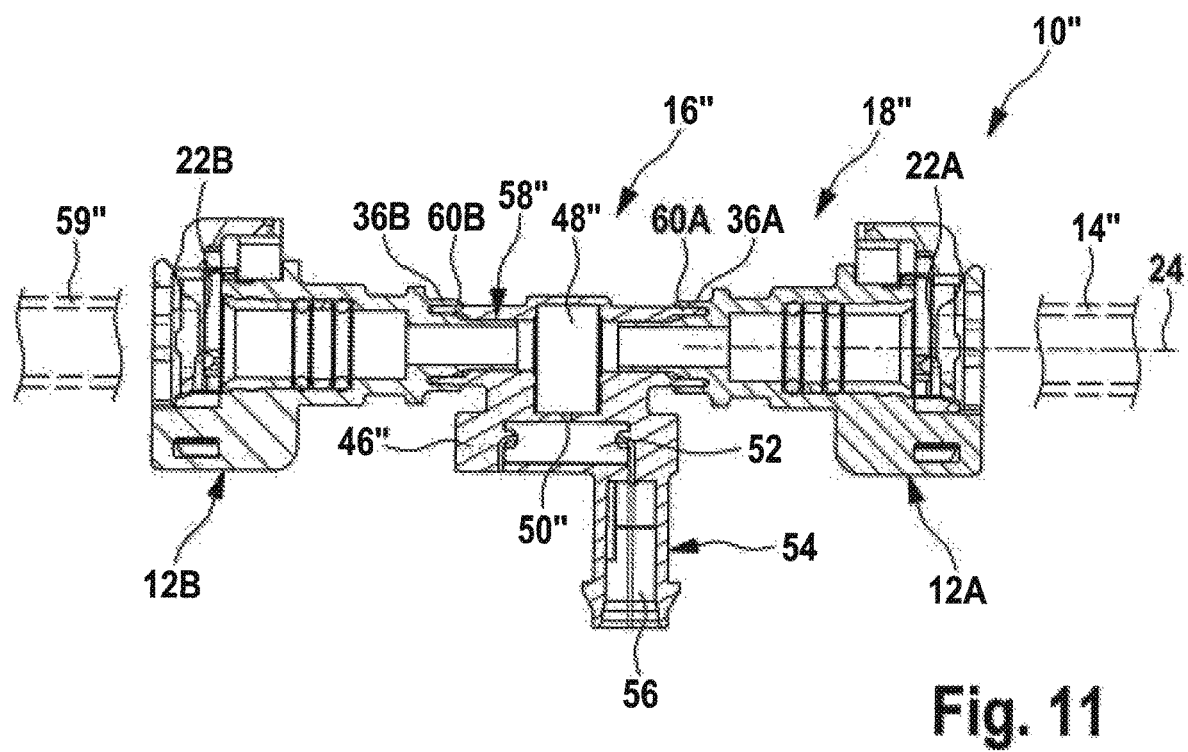
FIG. 11 a sectional view of another embodiment of a fluid pipeline arrangement.
Figure 12:
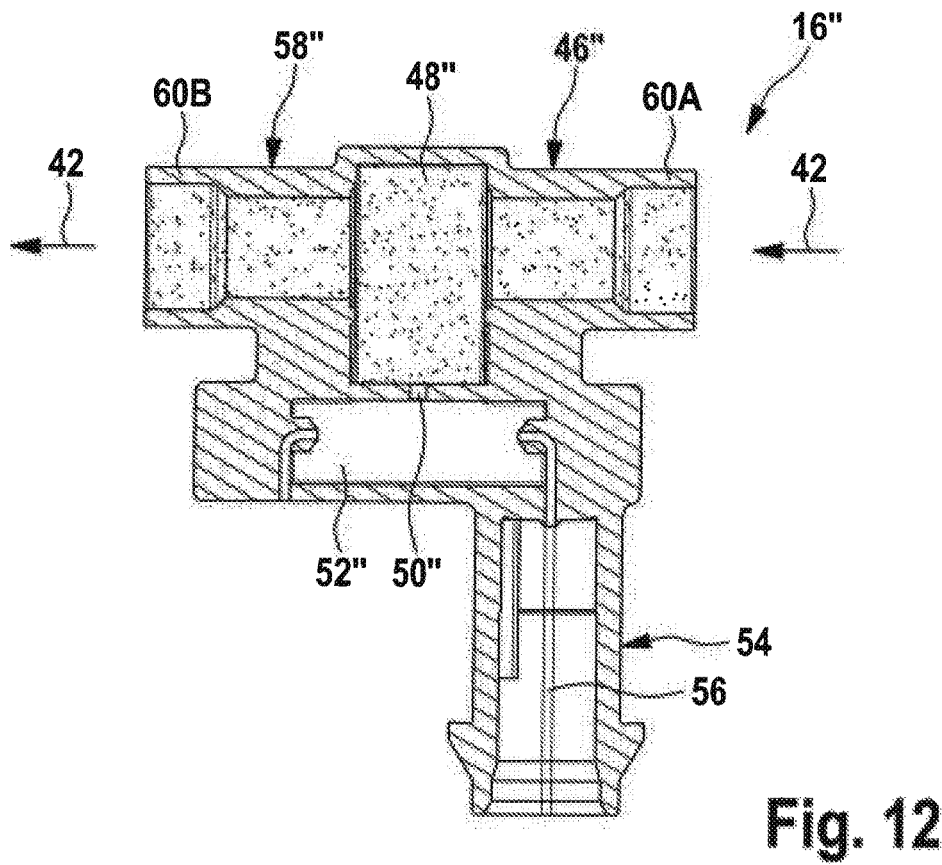
FIG. 12 a fluid interaction device of the fluid pipeline arrangement of FIG. 11.

In FIGS. 11 and 12, another embodiment of a fluid pipeline arrangement 10" is shown. This embodiment corresponds in design and function to the embodiment of FIGS. 3 to 10. Similar elements are given the same reference numerals. In the following, mainly the differences are explained.

The fluid pipeline arrangement 10" includes two quick connectors 12A, 12B which each can have the same construction as the quick connector 12 shown in FIGS. 3 to 9. In particular, each of the two quick connectors 12A, 12B includes a tube reception portion 36A, 36B, and a respective fluid line reception portion 22A, 22B.

The fluid pipeline arrangement 10", further, includes a fluid interaction device 16", which together with at least one of the quick connectors 12A, 12B forms a fluid interaction arrangement 18".

The fluid interaction device 16" includes, as shown in FIG. 12, a first tubular end portion 60A and a second tubular end portion 60B. The two tubular end portions 60A, 60B are coaxial along a fluid line axis 24, which also forms a joining axis for welded joints of the tubular end portions 60A, 60B with respective tube reception portions 36A, 36B of the quick connectors 12A, 12B. However, the tubular end portions 60A, 60B can also be arranged angularly to each other.

In an axial region between the two tubular end portions 60A, 60B, a fluid cavity 48 is formed, which is connected to a fluid interaction portion 50", via which the fluid in the fluid cavity 48 is in contact with a sensor body 52" which is integrated into the housing member 46". Further, the housing member 46" includes an electrical contact portion 54 that can be formed identical to the electrical contact portion 54 of the embodiment of FIGS. 3 to 9.

As is shown in FIG. 12, fluid 42 typically flows from one tubular end portion 60A to the other tubular end portion 60B, so that the fluid interaction portion 50" interacts with fluid flowing from one tubular end portion to the other tubular end portion.

The sensor 52" can be a temperature sensor, but also can be a pressure sensor, for example.

The tubular end portions 60A, 60B are preferably friction welded to the tube reception portions 36A, 36B. The second tubular end portion 60B, which forms the additional port 58", can also be formed by any other port type and need not be welded to a quick connector 12.

In each of the above embodiments, fluid lines 14" and/or 58" can easily be connected via a quick connector 12 or via two quick connectors 12A, 12B to a fluid interaction device 16, 16", so that the fluid interaction device 16, 16" can easily be connected to a fluid line or between two fluid lines.

In any of the above embodiments, at least some of the materials of the fluid interaction device and/or of the quick connector can be selected such that they are able to dissipate static electrification (electrostatic charging), as is shown schematically at "Ω" in FIG. 5.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for in-stance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

LIST OF REFERENCE NUMERALS

10 Fluid pipeline arrangement
12 Quick connector
14 Fluid line
16 Fluid interaction device
18 Fluid interaction arrangement 20 Quick connector body
22 Fluid line reception portion
24 Fluid line axis
26 Fluid line end portion
28 Sealing elements
32 Mechanical mechanism
34 Mechanical mechanism axis
36 Tube reception portion
38 Annular groove
40 Central conduit
42 Fluid
46 Housing member
48 Fluid cavity
50 Fluid interaction portion(s)
52 Sensor body
54 Electrical contact portion
56 Contact pins
58 Port
60 Tubular end portion
62 Friction welded joint
64 Lid
66 Contact axis
68 Socket
70 Socket cavity
72 Electrical wiring
74 Latching noses
78 Outer portion
80 Inner ring portion
86 Insertion cavity
88 Cone portion
90 Annular protrusion
92 Conduit portion
94 Friction welded joint
S Electrical signal at contact pins
U Unlocking position
L Locking position
A Wall thickness of tubular end portion
B Inner diameter of tubular end portion
C Outer diameter of inner ring portion 80
D Radial groove thickness of annular groove 38
E Outer diameter tubular end portion 60
F Inner diameter insertion cavity 86
G Inner diameter of outer ring portion 78
$L_1$ Axial length of tubular end portion

The invention claimed is:

1. A fluid interaction arrangement, comprising:
a fluid supply element having a tube reception portion; and
a fluid interaction device for establishing an interaction with a fluid, the fluid interaction device having a housing member which accommodates a fluid interaction portion, the fluid interaction portion being adapted to interact with a fluid within the housing member, wherein the housing member further comprises an electrical contact portion with a socket for receiving an electrical plug and a connection portion which is formed as a weldable, tubular end portion, wherein the housing member includes an injection molded thermoplastic material, wherein the housing member is connected to a joining portion of the fluid supply element by means of a welded joint, wherein the tubular end portion is rotationally symmetric along a joining axis, wherein the joining portion comprises an annular groove, wherein the welded joint is a friction welded joint formed between at least one circumferential surface of the tubular end portion and at least one circumferential surface of the tube reception portion such that a fluid-tight connection is established at the friction welded joint, and wherein the fluid interaction portion includes at least one of a sensor arrangement for sensing a state variable of fluid, a damper arrangement, or an active interaction portion, wherein the active interaction portion is a fluid cooler and/or a fluid heater.

2. The fluid interaction arrangement of claim 1, wherein the fluid supply element is a quick connection device which includes:
(i) a fluid line reception portion into which a line end portion of a fluid line can be inserted along a fluid line axis,
(ii) a mechanical mechanism that is moveable with respect to the fluid line reception portion between an unlocking position and a locking position parallel to a mechanical mechanism axis that is oriented transverse to the fluid line axis, in order to mechanically unlock or lock the line end portion of the fluid line with respect to the fluid line reception portion, and
(iii) the tube reception portion which forms the joining portion, the tube reception portion having the annular groove into which the tubular end portion of the fluid interaction device has been inserted along a tube axis, wherein the friction welded joint is established between the tube reception portion and the tubular end portion.

3. The fluid interaction arrangement of claim 2, wherein the tubular end portion has an inner diameter which is smaller than an outer diameter of an inner ring portion of the quick connection device, the inner ring portion defining an inner diameter of the annular groove.

4. The fluid interaction arrangement of claim 1, wherein the tubular end portion has a wall thickness which is larger than a radial groove thickness of the annular groove.

5. The fluid interaction arrangement of claim 1, wherein the tubular end portion has an outer diameter and an axial length, wherein the ratio of the outer diameter to the axial length is in a range from 0.5 to 3.0.

6. The fluid interaction arrangement of claim 1, wherein the tubular end portion has an inner diameter and a wall thickness, wherein a ratio of the inner diameter to the wall thickness is in a range from 4.0 to 16.0.

7. The fluid interaction arrangement of claim 1, wherein the housing member defines a housing member fluid conduit connecting the tubular end portion to a port of the housing member, so as to allow at least one of fluid being guided from the tubular end portion to the port and fluid being guided from the port to the tubular end portion.

8. The fluid interaction arrangement of claim 1, wherein the tubular end portion defines a reception cavity for receiving a ring portion of the fluid supply element.

9. The fluid interaction arrangement of claim 8, wherein the reception cavity is connected with the fluid interaction portion.

10. The fluid interaction arrangement of claim 1, wherein the sensor arrangement includes at least one of a pressure sensor and a temperature sensor.

11. The fluid interaction arrangement of claim 1, wherein the fluid interaction portion includes the damper arrangement.

12. The fluid interaction arrangement of claim 1, wherein the fluid interaction portion includes the active interaction portion that is the fluid cooler and/or the fluid heater.

13. A fluid interaction device for establishing an interaction with a fluid, having:
a housing member which accommodates a fluid interaction portion, the fluid interaction portion being adapted to interact with a fluid within the housing member, wherein the housing member further comprises an electrical contact portion with a socket for receiving an electrical plug and a connection portion which can be connected to a fluid supply element, wherein the connection portion is formed as a tubular end portion which is made of a material so that the housing member can be connected to a joining portion of the fluid supply element by means of a welded joint, wherein the welded joint is a friction welded joint formed between at least one circumferential surface of the tubular end portion and at least one circumferential surface of the joining portion such that a fluid-tight connection is established at the friction welded joint, and wherein the housing member includes an injection molded thermoplastic material, wherein the fluid interaction portion includes at least one of a sensor arrangement for sensing a state variable of fluid, a damper arrangement, or an active interaction portion, wherein the active interaction portion is a fluid cooler and/or a fluid heater.

14. The fluid interaction device of claim 13, wherein the tubular end portion is rotationally symmetric along a joining axis, wherein the joining portion is an annular groove, and wherein the welded joint is a friction welded joint.

15. The fluid interaction device of claim 13, wherein the tubular end portion has an outer diameter and an axial length, wherein the ratio of the outer diameter to the axial length is in a range from 0.7 to 1.5.

16. The fluid interaction device of claim 13, wherein the tubular end portion has an inner diameter and a wall thickness, wherein a ratio of the inner diameter to the wall thickness is in a range from 6.0 to 12.0.

17. The fluid interaction device of claim 13, wherein the housing member defines a housing member fluid conduit connecting the tubular end portion to a port of the housing member, so as to allow fluid being exchanged between the tubular end portion and the port.

18. The fluid interaction device of claim 13, wherein the tubular end portion defines a reception cavity for receiving a ring portion of the fluid supply element, wherein the reception cavity is connected with the fluid interaction portion.

19. The fluid interaction device of claim 13, wherein the fluid interaction portion includes the sensor arrangement for sensing a state variable of fluid, and the sensor arrangement includes at least one of a pressure sensor and a temperature sensor.

20. The fluid interaction device of claim 13, wherein the fluid interaction portion includes the damper arrangement.

21. The fluid interaction device of claim 13, wherein the fluid interaction portion includes the active interaction portion that is the fluid cooler fluid heater.

* * * * *